United States Patent
Sato et al.

(10) Patent No.: US 6,832,989 B2
(45) Date of Patent: Dec. 21, 2004

(54) INFRARED CLINICAL THERMOMETER

(75) Inventors: Tetsuya Sato, Kyoto (JP); Hiroyuki Ota, Kyoto (JP); Yoshihide Onishi, Kyoto (JP); Taiga Sato, Kyoto (JP)

(73) Assignee: Omron Corporation, Kyoto (JP)

( * ) Notice: Subject to any disclaimer, the term of this patent is extended or adjusted under 35 U.S.C. 154(b) by 209 days.

(21) Appl. No.: 10/172,990

(22) Filed: Jun. 18, 2002

(65) Prior Publication Data

US 2002/0193703 A1 Dec. 19, 2002

(30) Foreign Application Priority Data

Jun. 19, 2001 (JP) ........................................ 2001-185353

(51) Int. Cl.⁷ ............................................... A61B 5/00
(52) U.S. Cl. ..................................................... 600/549
(58) Field of Search .................................. 600/549, 659, 600/474, 475; 374/133, 126, 129, 164, 2, 123, 124, 132, 170

(56) References Cited

U.S. PATENT DOCUMENTS

| 4,900,162 A | * | 2/1990 | Beckman et al. | ............ 600/549 |
| 5,178,464 A | * | 1/1993 | Fraden | ........................ 374/129 |
| 5,487,607 A | * | 1/1996 | Makita et al. | ............... 600/549 |
| 6,001,066 A | * | 12/1999 | Canfield et al. | ............ 600/559 |

FOREIGN PATENT DOCUMENTS

| EP | 0 958 779 | 11/1999 |
| EP | 1 162 439 | 12/2001 |
| JP | 06-197870 | 7/1994 |
| JP | 08-215154 | 9/1996 |

* cited by examiner

*Primary Examiner*—Max F. Hindenburg
*Assistant Examiner*—Brian Szmal
(74) *Attorney, Agent, or Firm*—Morrison & Foerster LLP

(57) ABSTRACT

This invention is designed such that measurement can be performed only when a probe is sufficiently inserted into an external ear canal. A decision whether the probe is sufficiently inserted into the external ear canal or not is performed on the basis of a detected temperature.

23 Claims, 9 Drawing Sheets

[Fig. 1]
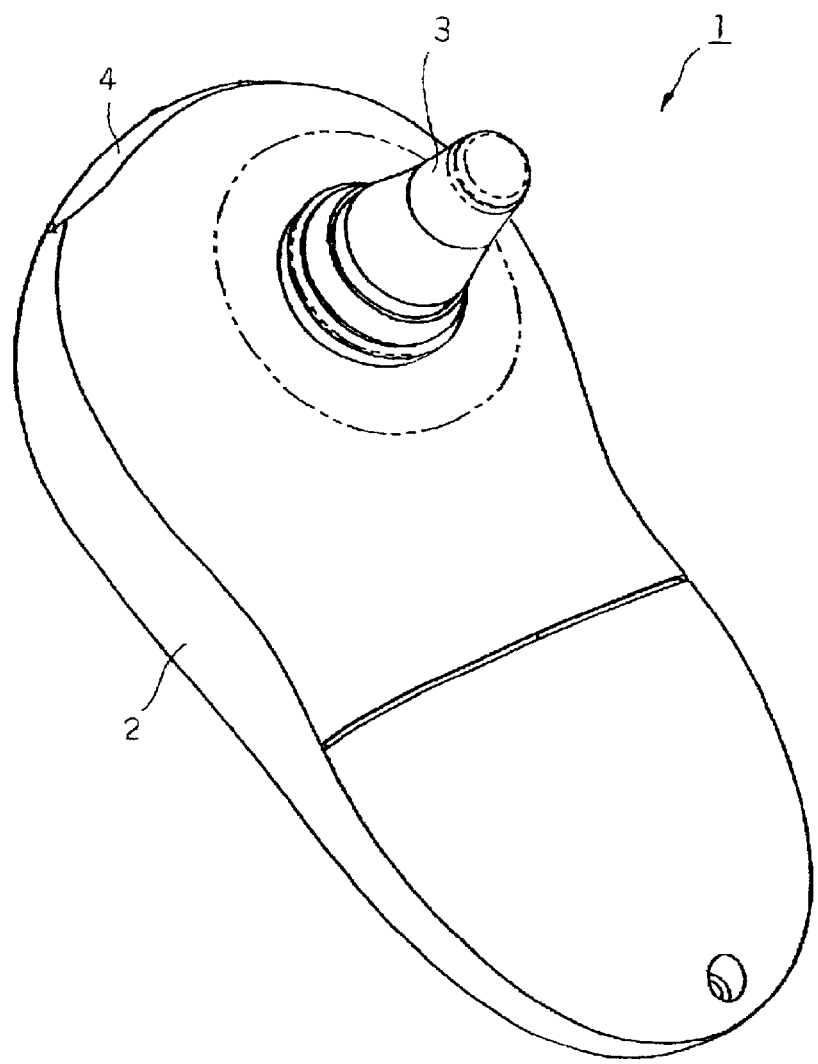

[Fig. 2]
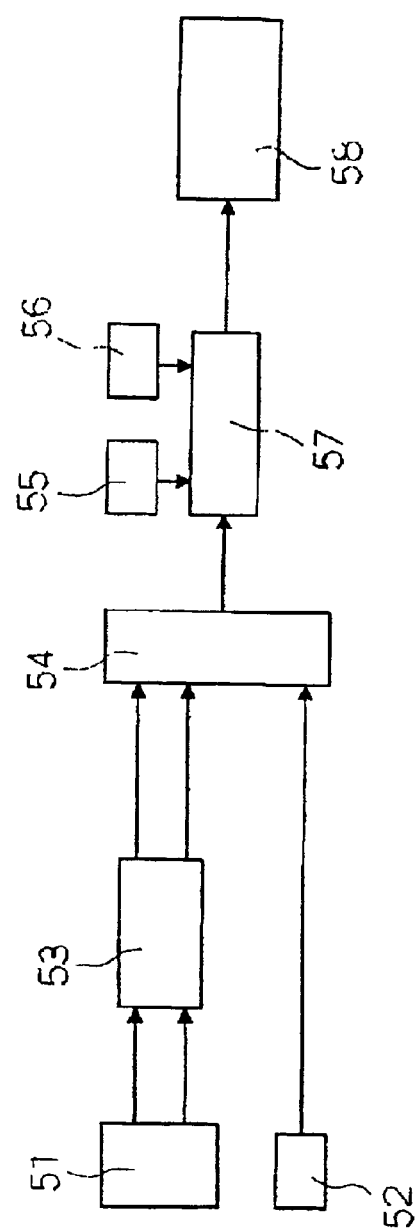

[Fig. 3]
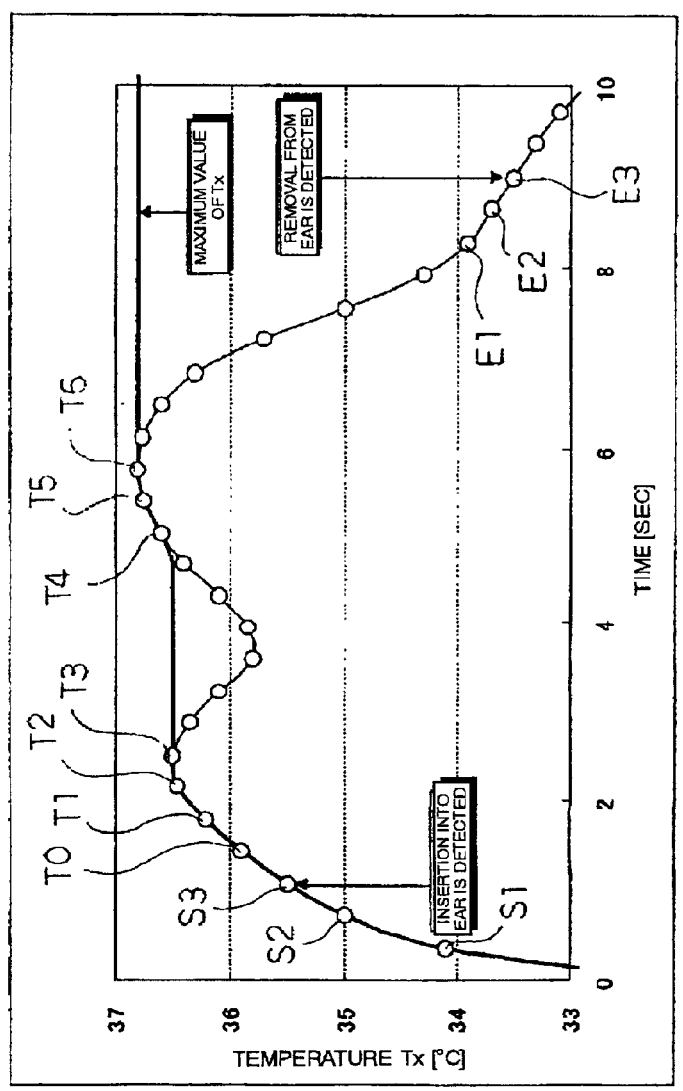

[Fig. 4]
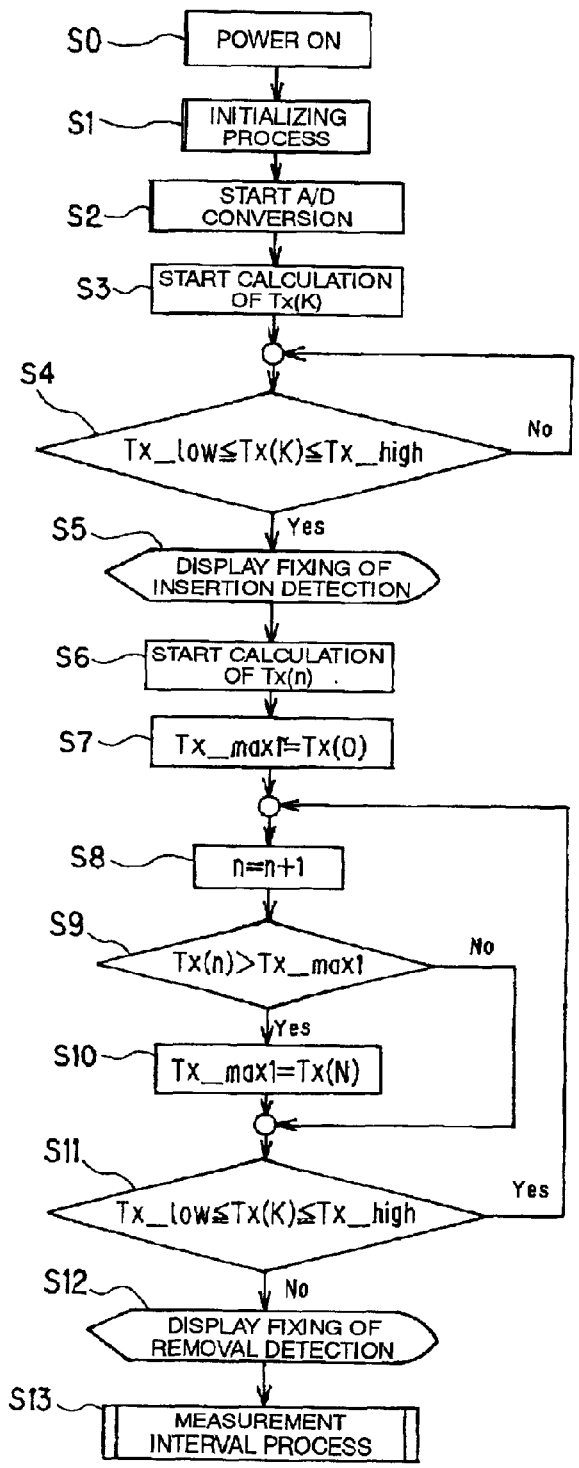

[Fig. 5]
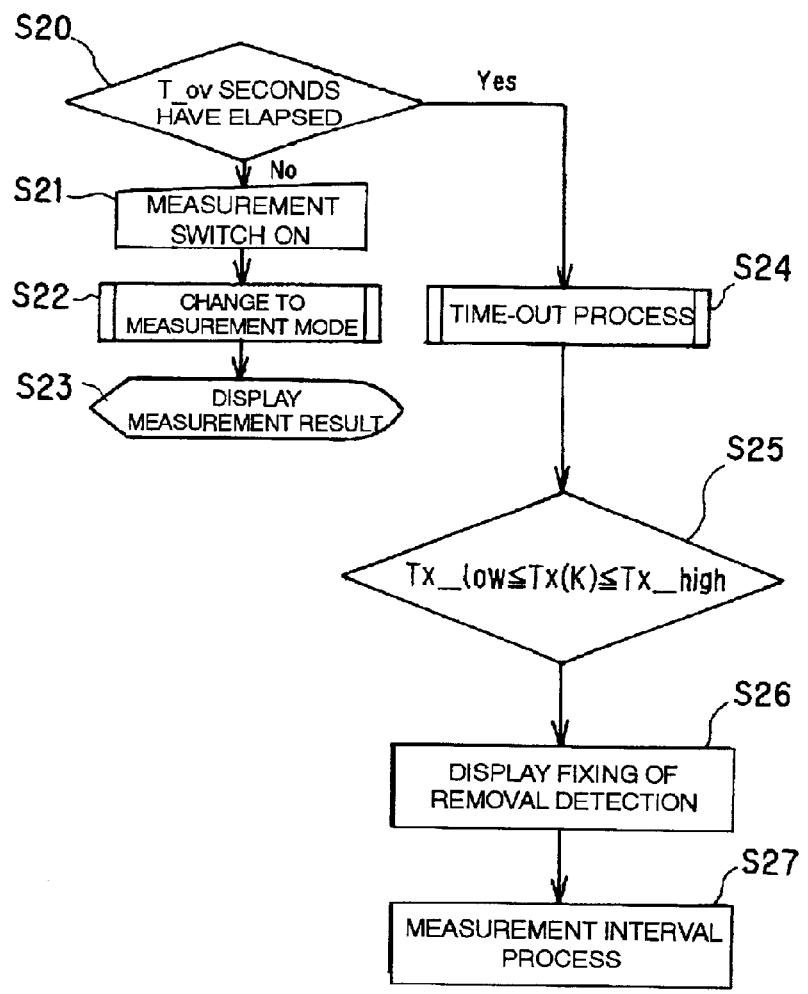

[Fig. 6]
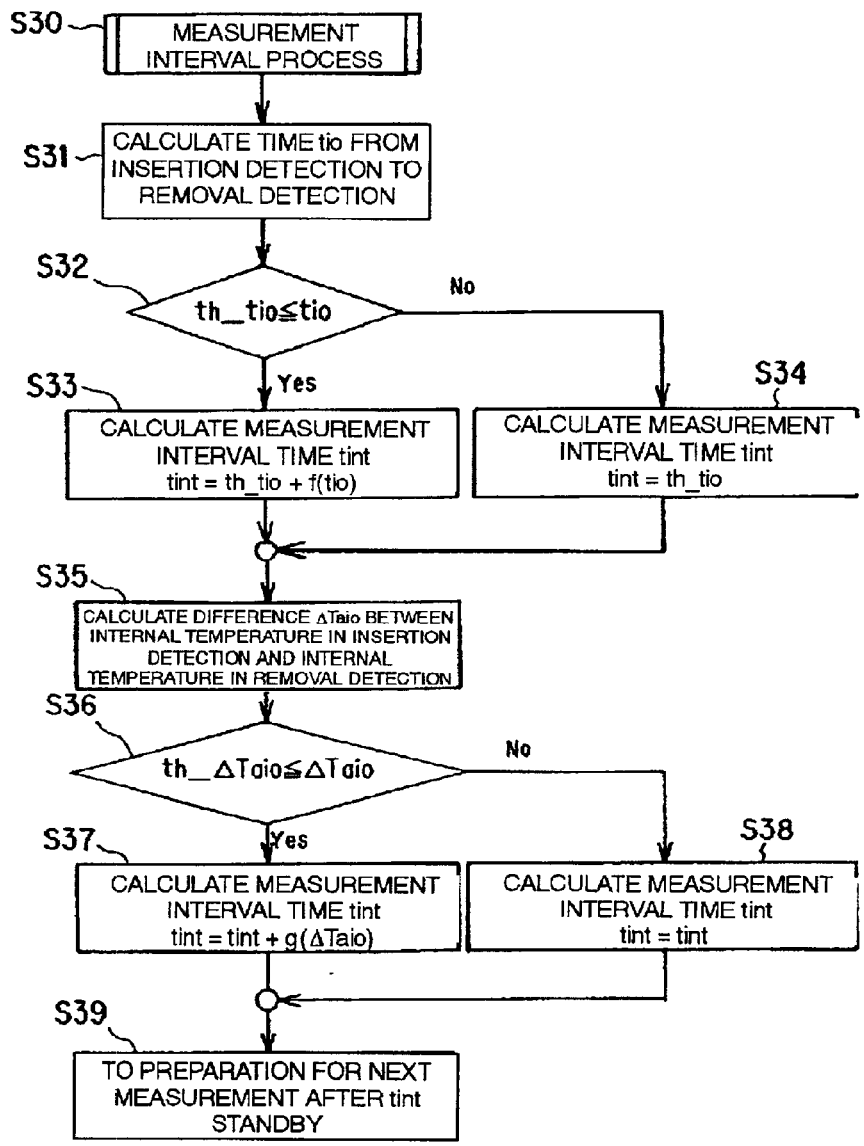

[Fig. 7]
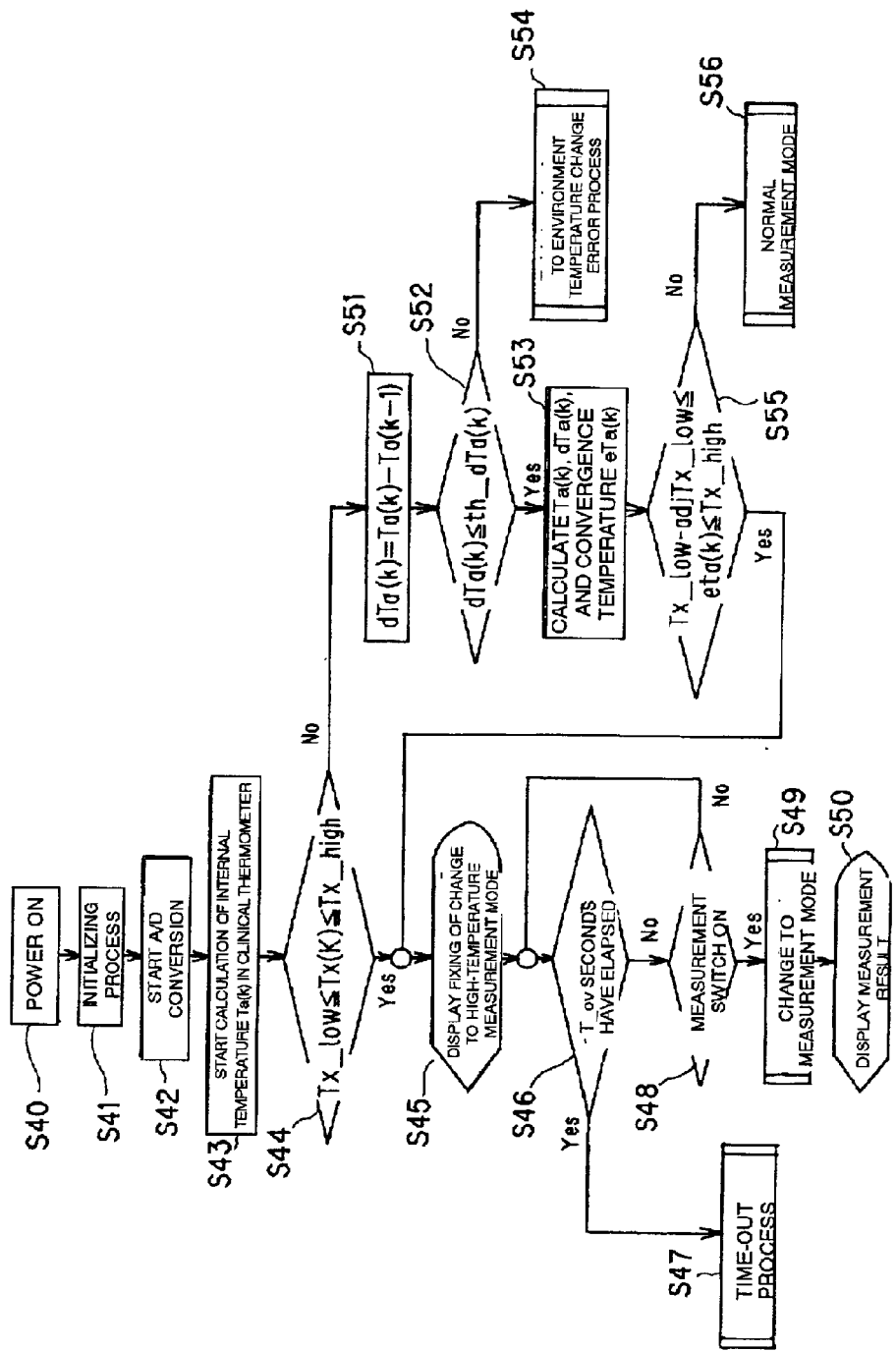

[Fig. 8]
(A) 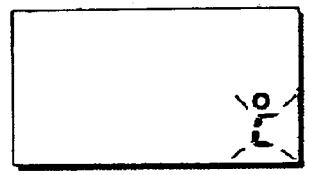
(B) 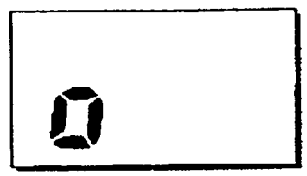
(C) 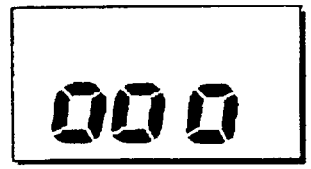
(D) 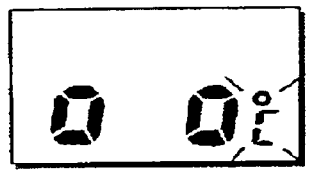
(E) 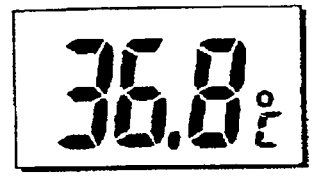

[Fig. 9]
PRIOR ART
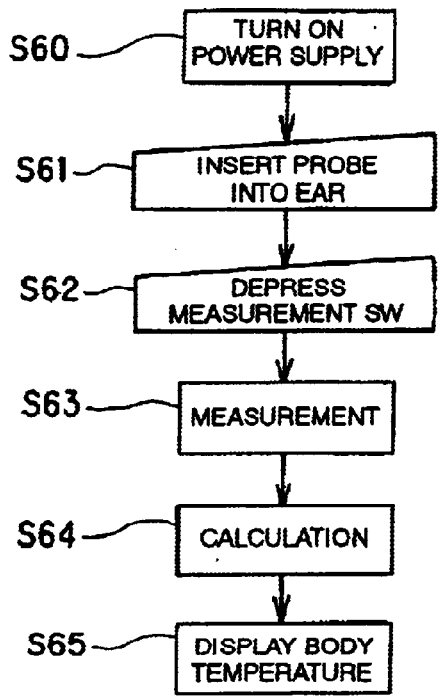
[Fig. 10]
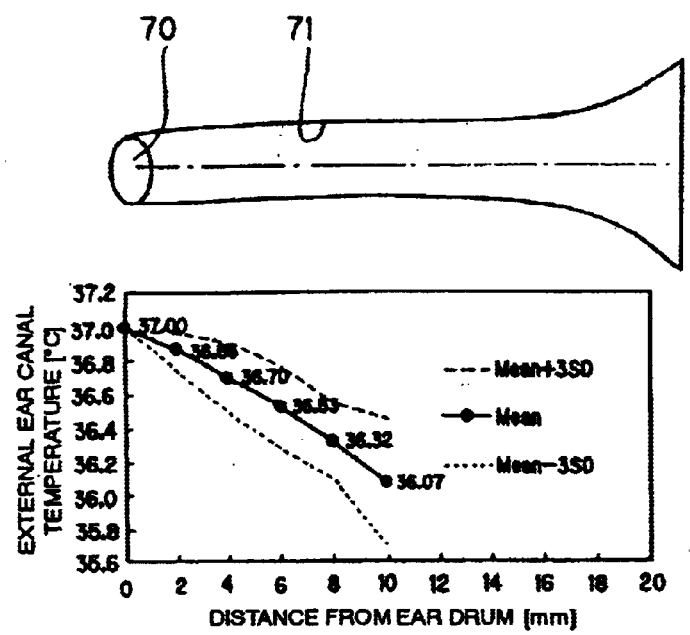

INFRARED CLINICAL THERMOMETER

BACKGROUND OF THE INVENTION

1. Field of the Invention

The present invention relates to an infrared clinical thermometer which detects infrared rays radiated from an ear drum.

2. Description of the Background Art

A conventional infrared clinical thermometer which detects infrared rays radiated from an ear drum is known.

In such an infrared clinical thermometer, a measurement switch is depressed while a probe is inserted into an external ear canal, the intensity of infrared rays radiated from an ear drum is detected by the probe, and a body temperature (more specifically, ear drum temperature) is measured on the basis of the detection result.

Measuring procedures performed when measurement is performed by using an infrared clinical thermometer according to a conventional art will be briefly described below. FIG. 9 is a flow chart which shows measuring procedures of the infrared clinical thermometer according to the conventional art.

A power supply is turned on (S60), and a probe is inserted into an ear (external ear canal) (S61). In this state, when a measurement switch (SW) is depressed (S62), an infrared sensor arranged inside the probe receives infrared rays from an ear drum to measure an intensity of infrared rays (measurement operation by an A/D converter or the like) (S63). A body temperature is calculated on the basis of the measurement result (S64), and the body temperature is displayed on an LCD or the like (S65).

The following art is known (trade name: OMRON MC-505) is known. That is, measurement (A/D conversion) is performed a plurality of times in (S63), and a mean of the plurality of A/D-converted values is used (S64), so that a more accurate body temperature can be measured.

As described above, in the conventional art, the measurement switch is depressed while the probe is inserted into an external ear canal to measure a body temperature. However, in this case, the measurement may be performed while a condition where the probe is inserted is not clear, and a measurement error may be increased.

More specifically, when the light-receiving surface of an infrared sensor arranged inside the probe does not accurately face the ear drum, the intensity of infrared rays radiated from the ear drum cannot be accurately measured. When the probe is inclined, the temperature of the external ear canal is measured.

FIG. 10 is a diagram which shows measurement results of temperature distributions of an ear drum 70 and an external ear canal 71. As shown in FIG. 10, it is understood that the temperature of the ear drum 70 is the highest inside the ear, and the temperature gradually decreases as it is away from the ear drum. In FIG. 10, the mean and dispersion of measurement results of a plurality of persons are shown.

In order to cancel the above drawbacks, in, e.g., Japanese Unexamined Patent Publication No. 8-215154 and U.S. Pat. No. 5,325,863, an art which employs a peak hold method which determines a body temperature by using the highest value of a plurality of measured values is disclosed.

According to this art, since a body temperature is calculated by a peak value of measured temperatures, possibility that a temperature obtained when a probe accurately faces an ear drum is captured is high.

However, in the conventional art described above, the following problems are posed.

First, the peak hold method described above is used, possibility that a body temperature obtained when an insertion condition of a probe is proper can be measured is high. However, a user cannot understand an insertion condition of the probe. For this reason, the body temperature may be measured while the insertion condition of the probe is still improper.

Therefore, in order to cause a user to learn a correct insertion position, the user must measure a plurality of times to be accustomed to use an infrared clinical thermometer.

Secondly, when measurement is performed while a probe is inserted into an external ear canal for a long time, or when measurement is repeated many times, a measurement error is large when measurement is performed while the temperature inside the probe is increased by heat received from the external ear canal or the like.

In the infrared clinical thermometer according to the conventional art, an interval for making it possible to perform the next measurement upon completion of the measurement may be set. However, since this interval is a fixed period of time, an interval until accurate measurement can be performed cannot be taken, and a measurement error may increase.

The interval time is started upon completion of the measurement regardless of the conditions or the like of the probe. For this reason, upon completion of the measurement, even though the probe is still inserted in the external ear canal, measurement can be performed after a fixed period of time. Therefore, the measurement error increases as described above.

Third, when the peak hold method is employed, a measurement error is generated depending on the surrounding environment temperature.

More specifically, in the peak hold method, a temperature is measured even though the probe does not face the ear drum, and the temperature is stored (held). For this reason, when the surrounding environment temperature is higher than the body temperature, before the probe is inserted into the external ear canal, the environment temperature has been stored. The surrounding temperature which is higher than the body temperature is measured.

SUMMARY OF THE INVENTION

The present invention has been made to solve the problems of the prior art, and has as its object to provide a reliable infrared clinical thermometer which can more accurately measure a temperature of an ear drum itself.

In order to achieve the above object, according to the present invention, there is provided an infrared clinical thermometer which has a probe inserted into an external ear canal, and a detection sensor, arranged inside the probe, for detecting infrared rays radiated from an ear drum, including: detection means for detecting an insertion condition of the probe into the external ear canal; and permission means for permitting measurement depending on a detection result obtained by the detection means.

The permission of measurement by the permission means that measurement can be performed. Therefore, when measurement by the permission means is not permitted, for example, even though a measurement switch is depressed while the probe is inserted into the external ear canal, measurement is not performed.

According to the configuration of the present invention, measurement is performed only when an insertion condition of the probe into the external ear canal is proper, a measurement error caused by an improper insertion condition can be prevented.

The infrared clinical thermometer preferably includes notification means for notifying a user of measurement permission by the permission means.

As the notification means, for example, means realized by a buzzer, a voice message, or the like can be used.

According to this configuration, it can be known that the insertion condition of the probe into the external ear canal is proper.

The detection means preferably detects the insertion condition of the probe into the external ear canal on the basis of a detection result continuously detected by the detection sensor.

The detection means preferably includes decision means for deciding whether the probe is inserted into the external ear canal or not depending on whether an infrared intensity or a temperature calculated from the infrared intensity falls within a predetermined range or not on the basis of the detection result continuously detected by the detection sensor.

The "infrared intensity or the temperature calculated from the infrared intensity" means that the decision may be directly performed by the infrared intensity or may be performed by the temperature calculated from the infrared intensity. More specifically, in order to decide whether the probe is inserted into the external ear canal, the decision is performed by the detected temperature itself. However, in general, the temperature is obtained by converting the infrared intensity serving as analog data into digital data. Since a result obtained by performing the decision before the conversion is the same as a result obtained by performing the decision after the conversion, the decision may be performed by the infrared intensity or the temperature calculated by the infrared intensity.

The decision means preferably fixes the decision that the probe is inserted into the external ear canal when the infrared intensity or the temperature calculated by the infrared intensity is held within the predetermined range for a predetermined time after the infrared intensity or the temperature calculated by the infrared intensity changes from an outside of the predetermined range to the predetermined range.

According to this configuration, the decision can be prevented from being performed when the insertion condition is unstable. Decision mistakes can be reduced.

The decision means preferably fixes the decision that the probe is removed from the external ear canal when the infrared intensity or the temperature calculated by the infrared intensity is held within the predetermined range for a predetermined time after the infrared intensity or the temperature calculated by the infrared intensity changes from the predetermined range to the outside of the predetermined range.

According to this configuration, the decision can be prevented from being performed when the insertion condition is unstable. Decision mistakes can be reduced.

The infrared clinical thermometer preferably includes storage means for storing data continuously detected by the detection sensor after the decision that the probe is inserted into the external ear canal is performed by the decision means, and at least one of the data stored in the storage means is preferably handled as data used in body temperature measurement.

According to this configuration, the probe can measure a body temperature in a condition where the probe is inserted into the external ear canal.

The infrared clinical thermometer preferably includes a switch for stopping a storing operation by the storage means.

The infrared clinical thermometer preferably includes time measurement means for measuring an elapsed time after the decision that the probe is inserted into the external ear canal is performed by the decision means, and the storing operation by the storage means is preferably stopped after it is measured by the time measurement means that a predetermined time has elapsed.

According to this configuration, a measurement error caused by the inside of the probe is heated by heat received from the external ear canal when the probe is inserted in the external ear canal for a long time can be reduced.

The infrared clinical thermometer preferably includes warning means for giving warning to a user when it is measured by the time measurement means that a predetermined time has elapsed before the storing operation is stopped by the switch.

According to this configuration, the user can know that the measurement is not performed.

Data corresponding to data in which the infrared intensity or the body temperature calculated by the infrared intensity is maximum of data stored in the storage means is preferably handled as data used in body temperature measurement.

According to this configuration, when the infrared intensity or the body temperature calculated by the infrared intensity is maximum, the probability that the infrared sensor correctly faces the ear drum is high, and the temperature of the ear drum can be more reliably measured.

The storage means preferably sequentially updates data to be stored such that only the data corresponding to the data in which the infrared intensity or the body temperature calculated by the infrared intensity is maximum from the data continuously detected by the detection sensor.

The infrared clinical thermometer preferably includes: a first mode in which data used in measurement is selected from data detected by the detection sensor depending on a detection result obtained by the detection means; and a second mode in which detection data obtained by the detection sensor immediately after detection instruction is performed is used by measurement regardless of the detection result obtained by the detection means.

According to this configuration, the detection means itself does not properly functions first of all due to a surrounding environment temperature or the like, only the data detected by the detection sensor immediately after the detection instruction is performed can be used by performing measurement in the second mode, and, when the temperatures which have been measured up to this include an environment temperature, the data can be prevented from being handled as measurement data.

The infrared clinical thermometer preferably includes: temperature detection means for detecting a temperature inside the probe; and mode switching means for switching the present mode to the second mode when it is detected by the temperature detection means that the temperature is not less than a predetermined temperature.

According to this configuration, for example, the predetermined temperature above is set to be a temperature closed to a temperature of general human beings' body temperature. In this case, when the environment temperature is not less than the temperature, the present mode is automatically switched to the second mode, so that the environment temperature can be prevented from being handled as measurement data.

The infrared clinical thermometer preferably includes estimation means for estimating a convergence temperature from a change in temperature detected by the temperature detection means, and the mode switching means preferably switches the present mode to the second mode when the temperature estimated by the estimation means is not less than a predetermined temperature.

According to this configuration, even though measurement is performed immediately after a position where measurement is performed is changed from a position where an environment temperature is low to a position where an environment temperature is high, the present mode is automatically switched to the second mode, so that the environment temperature can be prevented from being handled as measurement data.

A temperature condition used in a decision of switching obtained when the present mode is switched to the second mode by the mode switching means on the basis of the temperature detected by the temperature detection means is preferably different from a temperature condition used in a decision of switching obtained when the present mode is switched to the second mode on the basis of the temperature estimated by the estimation means.

According to this configuration, for example, an estimation error generated by the estimation means can be canceled.

According to the present invention, an infrared clinical thermometer which has a probe inserted into an external ear canal, and a detection sensor for detecting infrared rays radiated from an ear drum, includes: inhibition means for inhibiting measurement of a body temperature in a predetermined period after the body temperature is measured; and setting means for setting the predetermined period every measurement.

According to the configuration of the present invention, measurement of a body temperature is inhibited by the inhibition means in the predetermined period, so that a measurement error generated by a high temperature inside the probe caused by performing measurement can be canceled. Since the predetermined period can be set by the setting means every measurement, a proper process can be performed depending on a using state or the like.

The setting means preferably sets the predetermined time on the basis of a time required for measurement.

According to this configuration, since the internal temperature generally increases as the time required for measurement becomes long, a time for inhibiting measurement is preferably set to be long to cancel the measurement error. When the predetermined time is set on the basis of the time required for measurement, a measurement error based on an increase in internal temperature caused by measurement can be reduced. Waste of time caused when an inhibition time is needlessly lengthened can be reduced.

The infrared clinical thermometer preferably includes: temperature detection means for detecting a temperature inside the probe, and the setting means preferably sets the predetermined time on the basis of the detection result of the temperature detection means.

Therefore, a measurement error based on an excessively high internal temperature can be reduced.

BRIEF DESCRIPTION OF THE DRAWINGS

FIG. 1 is a perspective view showing the appearance of an example of an infrared clinical thermometer according to an embodiment of the present invention.

FIG. 2 is a block diagram showing the basic configuration of the infrared clinical thermometer according to the embodiment of the present invention.

FIG. 3 is a graph showing an example of a measurement progress of the infrared clinical thermometer according to the embodiment of the present invention.

FIG. 4 is a control flow chart in the infrared clinical thermometer according to the embodiment of the present invention.

FIG. 5 is a control flow chart in the infrared clinical thermometer according to the embodiment of the present invention.

FIG. 6 is a control flow chart in the infrared clinical thermometer according to the embodiment of the present invention.

FIG. 7 is a control flow chart in the infrared clinical thermometer according to the embodiment of the present invention.

FIG. 8 are diagrams showing display examples obtained by an LCD in respective states in the infrared clinical thermometer according to the embodiment of the present invention.

FIG. 9 is a flow chart showing measurement procedures of an infrared clinical thermometer according to a conventional art.

FIG. 10 is a diagram showing measurement results of temperature distributions of an ear drum and an external ear canal.

DETAILED DESCRIPTION OF PREFERRED EMBODIMENT

A preferred embodiment of the present invention will be illustratively described below in detail with reference to the accompanying drawings. The sizes, materials, shapes, and relative positions of components described in this embodiment are not limited to these according to the spirit and scope of the invention unless the components are specifically described.

An infrared clinical thermometer according to the embodiment of the present invention will be described below with reference to FIGS. 1 to 8.

A whole configuration or the like of the infrared clinical thermometer according to the embodiment of the present invention will be described below with reference to FIGS. 1 and 2. FIG. 1 is a perspective view showing the appearance of an example of an infrared clinical thermometer according to the embodiment of the present invention. FIG. 2 is a block diagram showing the basic configuration of the infrared clinical thermometer according to the embodiment of the present invention.

As shown in FIG. 1, an infrared clinical thermometer 1 briefly comprises an infrared clinical thermometer body 2, a probe 3 to be inserted into an external ear canal, and a measurement switch 4 used in measurement.

Since the infrared clinical thermometer itself is a known art, a detailed description thereof will be omitted. The infrared clinical thermometer comprises a battery arrangement unit serving as a power supply, a circuit board, a display unit for displaying a measurement result, and the like. In the example shown in FIG. 1, a display unit constituted by an LCD is arranged on the rear surface of the side on which the probe 3 is arranged.

When measurement is performed, the probe 3 is inserted into an external ear canal while the infrared clinical thermometer body 2 is gripped with one hand. In this state, when the measurement switch 4 is depressed, a body temperature (ear drum temperature) can be measured within a short time.

The infrared clinical thermometer will be described below in detail with reference to FIG. 2.

The infrared clinical thermometer 1 according to this embodiment is constituted such that an input signal from a power supply switch 55, an input signal from a measurement switch 56, and data transmitted from an A/D converter 54 are transmitted to a CPU 57 which controls the respective units.

When an input signal of a switch is transmitted from the power supply switch 55 to a CPU 57, an initializing process is performed to make it possible to perform detection of an infrared sensor 51.

Infrared rays are detected by the infrared sensor 51 serving as a detection sensor, an output signal from the infrared sensor 51 is amplified by an amplifier 53. The amplified signal is transmitted as analog data to the A/D converter 54 and is to be converted into digital data.

In this embodiment, a temperature sensor 52 serving as a temperature detection means for detecting an internal temperature (temperature in the body) of the probe 3 is arranged. An output from the temperature sensor 52 is transmitted to the A/D converter 54 and is to be converted into digital data.

These digital data are transmitted to the CPU 57.

In the CPU 57, a body temperature is calculated on the basis of these digital data and the input signal from the measurement switch 56, and the body temperature is displayed on an LCD 58.

Control or the like of the respective units will be described in detail below with reference to FIGS. 3 to 8. FIG. 3 is a graph showing an example of a measurement progress of the infrared clinical thermometer according to the embodiment of the present invention. FIGS. 4 to 7 are control flow charts in the infrared clinical thermometer according to the embodiment of the present invention. FIG. 8 is diagrams showing displays obtained by the LCD 58 in respective states.

In the infrared clinical thermometer 1 according to the embodiment of the present invention, a detection means for detecting an insertion condition of the probe 3 into an external ear canal is arranged. The infrared clinical thermometer 1 is designed such that measurement is permitted (permission means) only when it is decided from the detection result that the probe 3 is properly inserted.

More specifically, the infrared clinical thermometer 1 is designed such that measurement can be performed only when the probe 3 is sufficiently inserted into the external ear canal. A decision whether the probe 3 is sufficiently inserted into the external ear canal or not is performed on the basis of the detected temperature (decision means).

For example, when it is decided that the probe 3 is properly inserted into the external ear canal when the detected temperature is 34° C. or more and 42° or less, in the example in FIG. 3, the infrared sensor 51 sequentially detects infrared rays, and temperatures are sequentially calculated by the CPU 57. Of the temperatures, only temperature data falling within a region (34° C. or more and 42° C. or less) in which it is decided that the probe 3 is inserted is used as measurement data.

Therefore, data except for the data within the region is not displayed as measurement data.

When the probe 3 is inserted into the external ear canal, depending on cases, a detected temperature may be unstable near a threshold value of the temperature region. Immediately, when it is decided that the probe 3 is inserted into the external ear canal or removed from the external ear canal, possibility of an erroneous decision is high.

In this embodiment, when a state where the temperature falls within the decision range or a state where the temperature falls out of the decision range continues for a predetermined time, the decision is fixed for the first time.

More specifically, since calculation data are sequentially output in the embodiment, a decision is fixed when a state where the temperature falls within the decision region or falls out of the decision range is continuously decided three times. Therefore, in the example shown in FIG. 3, since detection data in a state where the temperature is 34° C. or less to a state where the temperature is 34° C. or more are continuously detected three times, i.e., S1, S2, and S3, a decision that the probe 3 is inserted into the external ear canal is fixed in the stage of S3.

In this manner, data detected and calculated thereafter can be used as measurement data. In this embodiment, when it is decided that the probe 3 is inserted into the external ear canal, the infrared clinical thermometer notifies a user that the probe 3 is inserted into the external ear canal by a notification means (buzzer or the like). Therefore, the user can confirm that the probe 3 is inserted into the external ear canal, and can know that measurement can be performed.

In the example shown in FIG. 3, since detection data in a state where the temperature is 34° C. or more to a state where the temperature is 34° C. or less are continuously detected three times, i.e., E1, E2, and E3, a decision that the probe 3 is removed from the external ear canal is fixed in the stage of E3.

Operation procedures will be described below in detail with reference to the flow chart shown in FIG. 4.

When the power supply (power supply switch 55) is turned on (S0), an initializing process is performed (S1). At this time, display is performed on a display unit (LCD 58) as shown in FIG. 8A.

In this manner, conversion of data output from the infrared sensor 51 and the temperature sensor 52 into digital data by the A/D converter 54 is started (S2), calculation of a measurement temperature (Tx(K)) by the CPU 57 is started (S3).

In order to detect whether the probe 3 is inserted into the external ear canal, it is decided whether a temperature Tx(K) falls within a predetermined temperature range (Tx_low to Tx_high) or not, i.e., 34° C. or more and 42° C. or less in the example shown in FIG. 3 or not (S4). As described above, the decision is preferably fixed only when the temperature continuously falls within the predetermined temperature range at three consecutive times.

When it is detected that the probe 3 is inserted into an external ear canal, insertion detection fixing is displayed (S5). For example, the display is performed on the LCD 58 as shown in FIG. 8B. In this case, a notification means such as a buzzer preferably notifies a user that the probe 3 is inserted into the external ear canal by sound.

Thereafter, calculation of a measurement temperature (Tx(n)) which can serve as data of a body temperature measurement temperature is sequentially started (S6). In this case, a plurality of temperatures are measured.

A measurement temperature Tx(0) which is measured for the first time is stored in a storage means (memory) as a maximum temperature Tx_max 1.

Thereafter, when the sequentially calculated temperature is higher than the previous temperatures, the maximum temperature Tx_max 1 is updated to the temperature (S8 to S10). This operation is repeated until it is decided that the probe 3 is removed from the external ear canal, i.e., until the temperature Tx(K) falls out of the temperature range (Tx_low to Tx_high) (S11). As described above, the decision is preferably fixed only when the temperature continuously falls out of the predetermined temperature range at three consecutive times.

Thereafter, in order to display that the probe 3 is removed from the external ear canal, removal detection fixing is displayed (S12), and a measurement interval process for inhibiting measurement for a predetermined time is performed (S13).

The processes performed up to this will be described below by using the case shown in FIG. 3 as an example.

After the initializing process, detection data of 34° C. or more exhibits at three consecutive times, and detection of a measurement temperature is started. Since sequentially measured temperatures gradually increase from T0 to T3 in FIG. 3, temperature data to be stored is updated.

Since the temperature of the subsequent data are lower than the temperature at T3 for a while, the temperature data to be stored is not updated, the temperature is updated again at T4. Thereafter, the temperature data is updated at T5 and T6.

The subsequent temperature data is lower than the temperature at T6, the temperature data is not updated. When detection data which is 34° C. or less exhibit at three consecutive times, it is decided that the probe 3 is removed from the external ear canal. It is displayed that the probe 3 is removed from the external ear canal.

The insertion condition of the probe 3 in the example shown in FIG. 3 indicates the following condition. That is, the distal end of the probe 3 is gradually inserted into an external ear canal, the direction of the distal end of the probe 3 directs toward a near drum and then shifts. Thereafter, the distal end directs toward the ear drum again, and the distal end correctly directs at a point of time T6.

Control processes in actual measurement will be described below with reference to the flow chart in FIG. 5.

The measurement can be performed at any time from step S5 to step S12. The flow chart shown in FIG. 5 is properly interrupted between step S5 and step S12 in the flow chart shown in FIG. 4.

In the embodiment, a time measurement means (timer) (not shown) for measuring an elapsed time after the decision that the probe 3 is inserted into the external ear canal is arranged. It is monitored by the time measurement means whether a time-out time (T_ov) set in advance has elapsed or not (S20).

When the measurement switch 56 is turned on before the time-out time (T_ov) has elapsed (S22), the present mode is switched to a measurement mode in which the maximum temperature Tx_max 1 stored in the storage means is set as the measurement value of the body temperature (S22), and the measurement result is displayed on the LCD (S23). FIG. 8E shows an example in which a measurement result is displayed.

In this case, when the measurement switch 56 is turned on, a temperature stored in the storage means is displayed. Therefore, the maximum measurement temperature obtained until the measurement switch 56 is turned on after it is decided that the probe 3 is inserted into the external ear canal is displayed.

Data obtained for a predetermined time after the measurement switch 56 is turned on is considered as a matter of course.

On the other hand, when the measurement switch 56 is not turned on before the time-out time (T_ov) has elapsed in step S20, a time-out process in step S24 is performed to inhibit measurement. At this time, a warning means for warning that the measurement cannot be correctly performed to the user is preferably arranged. For example, when warning is preferably performed by a buzzer, sound, or the like. At the same time, As shown in FIG. 8C, it is displayed on the LCD 58 that the measurement cannot be performed.

After the time-out process in step S24, as in the above description, after the probe 3 is removed from the external ear canal (S25), removal detection fixing is displayed (S26), and a measurement interval process for inhibiting measurement for a predetermined time is performed (S27).

The time-out process in step S24 as described above is performed for the following reason. That is, when a state in which the probe 3 is inserted into the external ear canal continues, the internal temperature of the probe 3 increases by heat received from the external ear canal, and this influence cannot be neglected. For this reason, in order to cancel a measurement error based on the influence, when the probe 3 is inserted for a predetermined time, measurement is not performed.

As the time-out time (T_ov), for example, about 20 seconds is preferable.

The measurement interval process will be described below with reference to the flow chart in FIG. 6.

As described above, the temperature inside the probe 3 (in the body of the thermometer) is high, a detection error is generated. Therefore, after measurement is performed, when the next measurement is performed again, an interval in which measurement is inhibited for a predetermined time must be arranged (inhibition means).

A time required for the interval actually changes depending on measurement states or environments. For this reason, in the embodiment, in order to make it possible to change the interval time depending on respective situations, it is designed that the interval time can be set every measurement. For example, a standard interval time is set to be 10 seconds, it is designed that the interval time can be changed within a range of 5 to 30 seconds.

More specifically, in measurement, the internal temperature of the probe 3 rises as the time for which the probe 3 is inserted in the external ear canal is long. For this reason, the interval time must be longer. In addition, the necessary interval time changes depending on an actual change in the temperature inside the probe 3. An influence caused when a person who has a high body temperature is different from an influence caused when a person who has a low body temperature. The influence also depends on the difference of environment temperatures.

For this reason, in consideration of this, the interval time is set. When a sufficient interval time is set in advance, a measurement error caused by an excessively high internal temperature can be reduced. However, the interval time is uniformly set to be long, a wasteful time becomes long, so that processing efficiency is consequently deteriorated. Therefore, the means is not appropriate.

As shown in FIG. 6, when the measurement interval process is started (S30), a time tio between detection of insertion of the probe 3 into the external ear canal and detection of removal is calculated (S31).

It is decided whether the time tio is a predetermined standard time th tio (for example 10 seconds) or more or not (S32).

When the tio does not reach the standard time th_tio, a measurement interval time tint is set for the moment to be a standard time th_tio (S34).

When the time tio is the standard time th_tio or more, a measurement interval time tint is set for the moment to be a time obtained by adding f(tio) to the standard time th_tio (S33).

In this case, since the longer measurement time is, the time f(tio) must be more increased, for example, the time f(tio) can be expressed by a linear expression which is in proportion to tio as expressed by $f(tio)=\ddot{a} \times tio$.

A difference $\ddot{A}Taio$ between an internal temperature in detection of insertion of the probe 3 and an internal temperature in detection of removal is calculated (S35). The internal temperatures are obtained by the temperature sensor 52.

The $\ddot{A}Taio$ changes depending on the body temperatures of persons, high or low body temperature, and depending on environment temperatures.

It is decided whether the $\ddot{A}Taio$ is a standard temperature difference $th\ddot{A}Taio$ (for example, 5° C.) or more or not (S36).

When the $\ddot{A}Taio$ does not reach the $th\ddot{A}Taio$, the measurement interval time tint is used without any change (S38).

On the other hand, when the $\ddot{A}Taio$ is the $th\ddot{A}Taio$ or more, the measurement interval time tint is set as a time obtained by adding $g(\ddot{A}Taio)$ to the measurement interval time tint calculated up to this (S37).

Since the larger $\ddot{A}taio$ becomes, the time $g\ddot{A}Taio)$ to be added must be more increased, for example, the time $g(\ddot{A}Taio)$ can be expressed by a linear expression which is in proportion to the Taio as expressed in $g(\ddot{A}Taio)=\hat{a} \times Taio$.

In this manner, the tint is calculated, and preparation is performed such that the next measurement can be performed after waiting for the measurement interval time tint (S39).

Even though the measurement switch or the like is depressed before the time tint has elapsed, a measurement time is not displayed.

An operation for reducing a measurement error when an environment temperature is high will be described below with reference to the flow chart in FIG. 7.

In the embodiment, as described above, in addition to a first mode in which measurement data is selected depending on a decision of an insertion condition of the probe 3 (i.e., the maximum temperature of a plurality of calculated temperatures is set as the measurement temperature), a second mode in which measurement is performed depending on surrounding environments is set.

More specifically, when an environment temperature is higher than a temperature obtained when it is decided the probe 3 is inserted into an external ear canal, even though the probe 3 is not actually inserted into the external ear canal, it is decided that the probe 3 is inserted into the external ear canal.

More specifically, in the example shown in FIG. 3, when the environment temperature is 34° C. or more, it is decided that the probe 3 is inserted regardless of the presence/absence of insertion of the probe 3. Calculation data obtained after the decision is recognized as a measurement temperature.

Therefore, if an environment temperature and a body temperature are 38° C. and 36° C., respectively, according to the control described avobe(first mode), before the probe 3 is inserted into the external ear canal, the temperature of 38° C. is stored in advance. The measurement temperature is 38° C., and an error occurs.

For this reason, in the second mode, the measurement temperature is calculated on the basis of only measurement data obtained after an input signal obtained by the measurement switch 56 is generated, so that such an error is reduced.

Therefore, since a body temperature is calculated on the basis of data detected when the user depresses the measurement switch 56 while the probe 3 is inserted into the external ear canal, a drawback that an external environment temperature is calculated as a measurement temperature can be prevented.

Switching to the second mode can also be arbitrarily set by the user. However, it is preferable that the switching to the second mode is automatically performed depending on an external environment temperature (temperature based on the temperature sensor 52 in the embodiment).

In a state immediately after movement from a place where an environment temperature is low to a place where an environment temperature is high, the temperatures (temperatures measured by the temperature sensor 52) measured inside the probe 3 do not include a high environment temperature. For this reason, this must be considered.

In the embodiment, an actual environment temperature is estimated from a change in temperature, the present mode is switched to the second mode when the estimated temperature is higher than a predetermined temperature.

A flow of concrete operations in the second mode will be described below with reference to FIG. 7.

As in the first mode, when the power supply is turned on (S40), the initializing process is performed (S41), A/D conversion is started (S42).

By the CPU 57, on the basis of detection data from the temperature sensor 52, calculation of a temperature Ta(K) inside the probe 3, i.e., in the infrared clinical thermometer is started.

It is decided that the temperature Ta(K) falls within the temperature range (Tx_low to Tx_high) used in the decision whether the probe 3 is inserted into the external ear canal, i.e., within a range of 34° C. to 42° C. or not (S44).

When the temperature Ta(K) falls within the temperature range, the decision whether the probe 3 is inserted into the external ear canal or not is not properly performed. For this reason, the present mode is automatically switched to the second mode, and fixing of the change to the high-temperature measurement mode (second mode) is displayed (S45). For example, display is performed as shown in FIG. 8D.

As in the first mode, it is monitored whether the time runs out or not (S46). When the time runs out, a time-out process (S47) is performed.

When the measurement switch is turned on before the time runs out (S48), the present mode is switched to the measurement mode (S49), and a measurement result is displayed (S50). As described above, in the second mode, a temperature is calculated as a measurement temperature of a body temperature on the basis of detection data obtained immediately after (lag may be set depending on cases) the measurement switch is turned on in the measurement mode.

On the other hand, in step S44, when the temperature Ta(K) does not fall within a temperature range (Tx_low to Tx_high), in order to measure a change in environment temperature, a temperature difference $dta(k)=Ta(k)-Ta(k-1)$ between a temperature (based on the temperature sensor 52) at time (k−1) and a temperature at time k at which a predetermined time has elapsed is measured.

It is decided whether the temperature difference dTa(k) is a predetermined standard temperature difference th_dTa(k) or less or not (S52).

When the temperature difference dTa(k) is larger than the standard temperature difference th_dTa(k), an actual environment temperature cannot be easily estimated because a change in environment temperature is excessively large. For this reason, an environment temperature change error process is performed (S54). In this case, measurement is inhibited.

The temperature difference dta(k) is equal to or less than the standard temperature difference th_dTa(k), a convergence temperature eTa(k) is calculated from the Ta(k) and the dTa(k) (S53). This convergence temperature eTa(k) is defined as an estimation temperature of an actual environment temperature.

Therefore, the convergence temperature eTa(k) falls within the temperature range (Tx_low to Tx_high), as in the above description, it is preferable that the present mode is automatically switched to the second mode.

However, since the estimated convergence temperature eTa(k) includes an error, it may be preferable that the threshold value of the convergence temperature eTa(k) is smaller than the temperature used in the decision that the present mode is switched to the second mode on the basis of an actually measured temperature by the error.

Therefore, in the embodiment, it is decided whether Tx_low−adjTx_low≦eTa(k)≦Tx_high is satisfied or not (S55). When the expression is satisfied, the present mode is automatically switched to the second mode (S45). When the expression is not satisfied, measurement is performed in the normal measurement mode (first mode) (S56).

As the adjTx_low, about 2° C. is preferably set in consideration of an error range based on experiment data.

As has been described above, the present invention can more accurately measure a temperature of an ear drum itself to achieve good reliability.

What is claimed is:

1. An infrared clinical thermometer, comprising:
   a probe configured for insertion into an external ear canal,
   a detection sensor, arranged inside said probe, for detecting infrared rays radiated from an ear drum, comprising a detector for detecting an insertion condition of said probe into the external ear canal, and
   a permission unit that permits measurement of infrared intensity, temperature or other condition by said infrared clinical thermometer depending on a detection result obtained by said detectors,
   wherein said detector detects the insertion condition of said probe into the external ear canal on the basis of a detection result continuously detected by said detection sensor, and
   wherein said detector comprises a decision unit deciding whether said probe is inserted into the external ear canal depending on whether an infrared intensity or a temperature calculated from the infrared intensity falls within a predetermined range or not on the basis of the detection result continuously obtained by said detector.

2. An infrared clinical thermometer according to claim 1, further comprising a notifying unit for notifying a user of measurement permission by said permission unit.

3. An infrared clinical thermometer according to claim 1, wherein said decision unit makes a decision that said probe is inserted into the external ear canal when the infrared intensity or the temperature calculated from the infrared intensity is held within the predetermined range for a predetermined time after the infrared intensity or the temperature calculated by the infrared intensity changes from a value outside of the predetermined range to a value within the predetermined range.

4. An infrared clinical thermometer according to claim 3, wherein said decision unit makes the decision that said probe is removed from the external ear canal when the infrared intensity or the temperature calculated from the infrared intensity is held within the predetermined range for a predetermined time after the infrared intensity or the temperature calculated from the infrared intensity changes from the value within the predetermined range to the value outside of the predetermined range.

5. An infrared clinical thermometer according to claim 3, further comprising a storage unit that stores data continuously detected by the detector after the decision that said probe is inserted into the external ear canal is made, and wherein at least one item of the data stored in said storage unit is handled as data used in body temperature measurement.

6. An infrared clinical thermometer according to claim 3, wherein the measurement of infrared intensity, temperature or other condition by said infrared clinical thermometer depending on data obtained by said detection sensor is carried out in a first mode in which data used in measurement is selected from data detected by said detection sensor depending on the detection result obtained by said detector or a second mode in which detection data obtained by said detection sensor immediately after detection instruction is performed is used by measurement regardless of the detection result obtained by said detector.

7. An infrared clinical thermometer according to claim 1, wherein said decision unit makes the decision that said probe is removed from the external ear canal when the infrared intensity or the temperature calculated from the infrared intensity is held within the predetermined range for a predetermined time after the infrared intensity or the temperature calculated from the infrared intensity changes from a value within the predetermined range to a value outside of the predetermined range.

8. An infrared clinical thermometer according to claim 1, further comprising a storage unit that stores data continuously detected by the detector after the decision that said probe is inserted into the external ear canal is made, and wherein at least one item of the data stored in said storage unit is handled as data used in body temperature measurement.

9. An infrared clinical thermometer according to claim 8, further comprising a switch for stopping a storing operation by said storage unit.

10. An infrared clinical thermometer according to claim 9, comprising a time measurement unit that measures an elapsed time after the decision that said probe is inserted into the external ear canal is made by said decision unit, and wherein the storing operation by said storage unit is stopped after said time measurement unit measures that a predetermined time has elapsed.

11. An infrared clinical thermometer according to claim 10, further comprising a warning device that gives a warning to a user when the time measurement unit determines that a predetermined time has elapsed before the storing operation is stopped by said switch.

12. An infrared clinical thermometer according to claim 10, wherein data corresponding to data in which the infrared intensity or the body temperature calculated by the infrared intensity is a maximum of data stored in said storage unit is handled as data used in body temperature measurement.

13. An infrared clinical thermometer according to claim 10, wherein the measurement of infrared intensity, temperature or other condition by said infrared clinical thermometer depending on data obtained by said detection sensor is carried out in a first mode in which data used in measurement is selected from data detected by said detection sensor depending on the detection result obtained by said detector or a second mode in which detection data obtained by said detection sensor immediately after detection instruction is performed is used by measurement regardless of the detection result obtained by said detector.

14. An infrared clinical thermometer according to claim 10, wherein said storage unit sequentially updates data to be stored such that only the data corresponding to the data in which the infrared intensity or the body temperature calculated from the infrared intensity is a maximum value from the data continuously detected by said detection sensor.

15. An infrared clinical thermometer according to claim 9, wherein data corresponding to data in which the infrared intensity or the body temperature calculated by the infrared intensity is a maximum of data stored in said storage unit is handled as data used in body temperature measurement.

16. An infrared clinical thermometer according to claim 8, wherein said storage unit sequentially updates data to be stored such that only the data corresponding to the data in which the infrared intensity or the body temperature calculated from the infrared intensity is a maximum value from the data continuously detected by said detection sensor.

17. An infrared clinical thermometer according to claim 1, wherein the measurement of infrared intensity, temperature or other condition by said infrared clinical thermometer depending on data obtained by said detection sensor is carried out in a first mode in which data used in the measurement is selected from data detected by said detection sensor depending on the detection result obtained by said detector or a second mode in which detection data obtained by said detection sensor immediately after the detection is used by measurement regardless of the detection result obtained by said detector.

18. An infrared clinical thermometer according to claim 17, further comprising:

a temperature detector for detecting a temperature inside said probe; and a mode switch for switching the infrared clinical thermometer from the first mode to the second mode when the temperature detector detects that the temperature is not less than a predetermined temperature.

19. An infrared clinical thermometer according to claim 18, further comprising an estimation unit for estimating a convergence temperature from a change in temperature detected by said temperature detector, and wherein said mode switch switches the infrared clinical thermometer from the first mode to the second mode when the temperature estimated by said estimation unit is not less than a predetermined temperature.

20. An infrared clinical thermometer according to claim 19, wherein a temperature condition used in a decision of switching obtained when the infrared clinical thermometer is switched from the first mode to the second mode by said mode switch on the basis of the temperature detected by said temperature detector is different from a temperature condition used in a decision of switching obtained when the infrared clinical thermometer is switched from the first mode to the second mode on the basis of the temperature estimated by said estimation unit.

21. An infrared clinical thermometer, comprising:

a probe configured for invention into an external ear canal and a detection sensor detecting infrared rays radiated from an ear drum which comprises inhibition means for inhibiting measurement of a body temperature for a predetermined period after the body temperature is measured; and setting means for resetting the predetermined period after every measurement.

22. An infrared clinical thermometer according to claim 21, wherein said setting means sets the predetermined time on the basis of a time required for measurement.

23. An infrared clinical thermometer according to claim 21, further comprising temperature detection means for detecting a temperature inside said probe, and wherein the setting means sets the predetermined time on the basis of the detection result of said temperature detection means.

* * * * *